United States Patent

Charles

[15] 3,678,535
[45] July 25, 1972

[54] SECTIONAL SANDWICH PANEL INSERT WITH FRICTIONAL TELESCOPIC COUPLING

[72] Inventor: James F. Charles, La Palma, Calif.
[73] Assignee: Shur-lok Corporation, Santa Ana, Calif.
[22] Filed: Nov. 27, 1970
[21] Appl. No.: 93,266

[52] U.S. Cl. .......................... 16/2, 85/73, 85/77
[51] Int. Cl. .......................................... B65d 7/44
[58] Field of Search .............. 16/2; 85/39, 73, 74, 32.1, 85/77; 52/617; 29/523

[56] References Cited

UNITED STATES PATENTS 2,700,172  1/1955  Rohe ................................. 16/2
2,154,012  4/1939  Rhodes ............................ 85/39
3,078,002  2/1963  Rodgers .......................... 85/73

Primary Examiner—Bobby R. Gay
Assistant Examiner—Darrell Marquette
Attorney—Lynn H. Latta

[57] ABSTRACT

A grommet-like insert for sandwich panels consists of two tubular sections, one having a male tip forced into a counterbore in a female skirt on the end of the other section so as to expand the skirt past its elastic limit and into the plastic deformation range, thereby providing a high load bearing capacity. The strength of the coupling is increased by work-hardening which occurs in the expansion of the skirt with a limited compression of the male tip. The diameter of the expanded skirt is substantially increased, and its tip cooperates with the opposed grommet head to grip the panel skin between them to provide high shear resistance.

10 Claims, 5 Drawing Figures

PATENTED JUL 25 1972
3,678,535
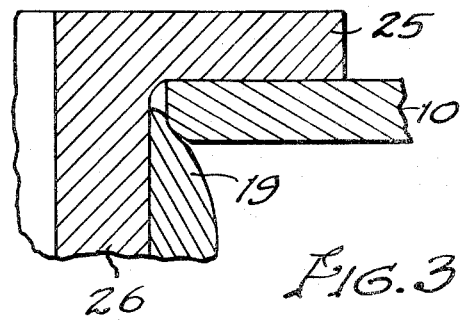
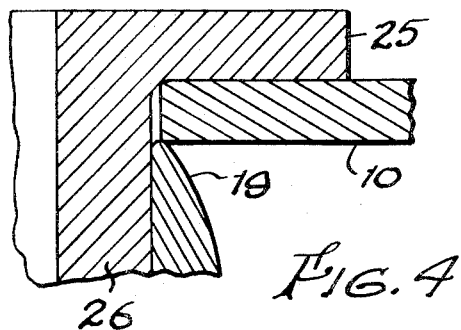
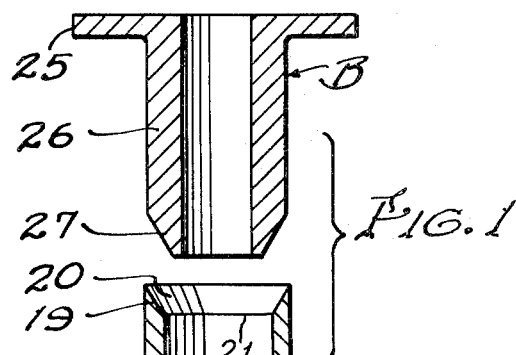
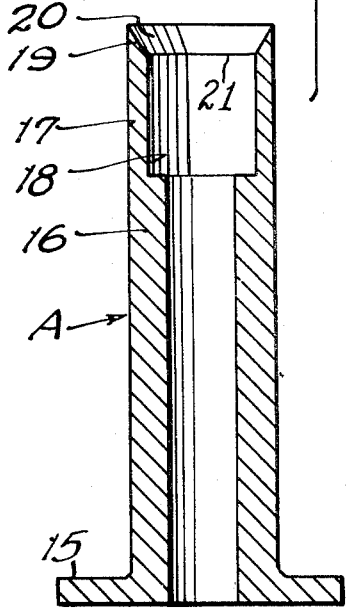
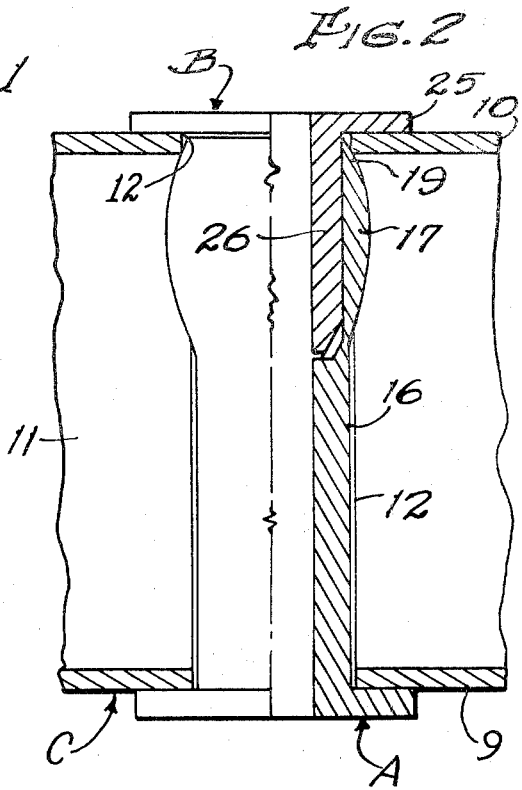
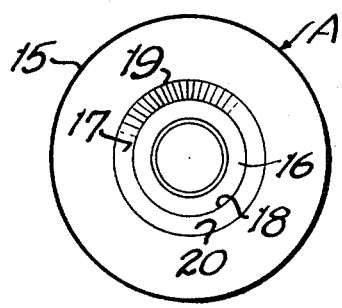
INVENTOR.
JAMES F. CHARLES
BY Lynn N. Latta
—ATTORNEY—

SECTIONAL SANDWICH PANEL INSERT WITH FRICTIONAL TELESCOPIC COUPLING

BACKGROUND OF THE INVENTION

Panel inserts of grommet form utilizing sections coupled end to end, are known and widely used. Such an insert is disclosed in Rohe U.S. Pat. No. 2,700,172.

The general object of the invention is to provide improved shear load-holding strength in a grommet-type insert.

Other objects will become apparent in the following specifications and appended drawing, in which:

FIG. 1 is an exploded axial sectional view of an insert embodying the invention;

FIG. 2 is an axial sectional view of the insert, assembled in a sandwich panel;

FIG. 3 is a fragmentary axial sectional view on an enlarged scale, of the coupling portion of the insert;

FIG. 4 is a fragmentary axial sectional view of a portion of the coupling, in modified form; and FIG. 5 is an end view of the spacer part.

Referring now to the drawing in detail, I have shown therein, as an example of one form in which the invention may be embodied, an insert comprising two sections referred to hereinafter as a spacer A and a grommet B. In assembly, the insert is adapted to extend through a lightweight sandwich panel C comprising a pair of spaced parallel skins 9 and 10 which may be of various essentially thin materials (e.g. aluminum, plastic composite glass fiber, or composites of various fiber materials) bonded to opposite sides of a low-density core 11 which is usually of honeycomb cellular material or foam material. The insert is installed in a hole 12 drilled through the panel.

Spacer section A, prior to assembly (FIG. 1) comprises a flat circular disc head 15, a cylindrical tubular shank 16 projecting from head 15 at one end, a relatively thin walled skirt 17 defining a counterbore 18 at the other end, and an annular lip 19 of acute angular section, less than 45° (preferably about 30°) defining said other end, the lip being defined by a frustoconical throat 20 flaring outwardly toward said other end, and intersecting the cylindrical outer face of skirt 17. Counterbore 18 extends to a depth only a portion of A, terminating in an annular bottom (not numbered) intermediate the ends of the spacer.

Spacer A is of a tough, malleable material such as non-ferrous alloys, (e.g. aluminum etc.) and amorphous materials (e.g. plastics, nylons, acrylics, polycarbonates, polypropylenes, etc. and/or reinforced composites of these materials). The selected material is one having a modulus of elasticity of up to 17,300,000 psi. (e.g., where of non-ferrous alloy) and where it is an amorphous material (e.g., a plastic) it is one having a modulus of elasticity in the range of 178,000 psi. to 1,300,000 psi.

Grommet section B comprises a flat circular disc head 25 and an integral cylindrical tubular plug 26 integrally joined at one end to one side of the head. The other end of the plug 26 is externally beveled to provide a cone 27, for entry into the skirt 17. The outer diameter of plug 26 exceeds the diameter of counterbore 18 by a dimension more than half the wall thickness of spacer skirt 17. Consequently, during assembly of the insert, in which plug 26 is forced into skirt 17 (in a manner such that it cannot collapse inwardly) the skirt 17 will be expanded to an extent of more than half its wall thickness, the plug 26 having entered counterbore 18 with its cone tip 27 substantially reaching the bottom of the counterbore when the insert is fully installed (FIG. 2). For example, where the external diameter of spacer 16 and skirt 17 is in the range of 0.304–0.307 inch, the diameter of counterbore 18 is in the range of 0.254–0.257 inch, the wall thickness of skirt 17 is in the range of 0.0235–0.0265 inch, and the outer diameter of plug 26 is in the range of 0.284–0.289 inch, the interference fit (excess of plug radius over counterbore radius) is in the range of 0.014 to 0.017 inch — about 60–64 percent of skirt wall thickness.

The ratio of wall thickness of grommet plug 26 to the wall thickness of skirt 17 is in the range of 1.25:1 or greater, a preferred ratio being 1.8:1.

The bevel of cone 27 subtends an angle of less than 30° to the axis of plug 26, preferably in the range of 24°–26°, an optimum angle being about 25°. At its tip, cone 27 has an external diameter very slightly less than the internal diameter of counterbore 18. For example, where the outer diameter of the plug tip is in the range of 0.250 to 0.255 inch inches, the internal diameter of counterbore 18 is in the range of 0.254–0.257 inch.

The throat 20 at the tip of skirt 17 subtends an angle of approximately 60° at the spacer axis. Accordingly, the beveled tip 19 of skirt 17 has a cross-sectional angle of approximately 30°. The annular shoulder 21 defined between counter bore 20 and throat 18 engages the conical surface of bevel 27 to provide a pivot fulcrum around which the beveled tip 19 is turned inwardly as the skirt 17 is expanded around bevel 27. As the skirt 17 is progressively expanded, it will pass through its elastic limit and enter the range of plastic deformation in which a thinning of the wall of skirt 17 occurs, the tip portion 19 of the skirt will be turned inwardly around grommet shank 26 and finally will be wedged against skin 10. The skirt 17 will have developed a varying wall thickness during its expansion, and the skin 10 will be clamped between the skirt tip 19 and the opposed grommet head 25. This clamping action appears to be a factor in the considerably improvement in shear-loading strength which is attained by this invention over the prior art insert referred to above. Such improvement, as indicated by tests of my insert against the insert of the prior art, involves an increase of over 30 percent in the shear load strength above the expected shear load strength.

In the installation of the insert, the hole 12 is bored through the panel C at a diameter only slightly larger than the outer diameter of spacer shank 16, and substantially larger than the outer diameter of grommet plug 26. The skirt 17 is expanded to a diameter greater than that of hole 12 except at the edge of its internal lip 19, in some installations where the tip 19 may be wedged into hole 12 as indicated in FIG. 2. In other installations it may abut the flat inner surface of panel skin 10 without being forced into the hole (FIG. 4). In this respect the beveled tip 19 provides for adaptation to a limited range of panel thicknesses, in that its thin edge can be deformed inwardly to enter the hole in the skin where panel thickness is less than normal, whereas, in a thicker panel its edge may be pressed against the skin surface to establish the clamping action without being forced into the hole in the skin.

I claim

1. A grommet type insert for a sandwich panel having a low density core sandwiched between skins of supporting sheet material and provided with a through hole, comprising:

a spacer including a head adapted to abut one of said skins and a tubular shank integrally joined to said head at one end and adapted to extend through said hole in closely fitted relation thereto, said shank having at its other end a counterbore and a skirt within which said counterbore is defined, said skirt having a wall thickness substantially less than that of said shank, said skirt having at said other end an extremity consisting of an annular lip of tapered thickness defined around an outwardly flaring frustoconical throat intersecting said counterbore to define an annular shoulder of obtuse angular section;

and a grommet comprising a tubular plug and an integral head at one end thereof adapted to abut the other skin of said panel, said plug having its other end externally beveled to provide a cone adapted to enter said spacer throat and to engage said annular shoulder with an expanding effect, said plug having a length such that its said other end will substantially reach the bottom of said counterbore in the fully installed insert;

the outer diameter of said plug being greater than the diameter of said counterbore to an extent such that the forcible entry of said plug into said counterbore will expand said skirt beyond its elastic limit and into its plastic deformation range, and will cause said annular lip to be turned inwardly by fulcruming of said annular shoulder on said cone in response to the expansion of said skirt.

2. An insert as defined in claim 1, wherein the wall thickness of said grommet plug is related to the wall thickness of said spacer skirt by a ratio of not less than 1.25 to 1.

3. An insert as defined in claim 2, wherein said ratio is of the order of 1.8 to 1.

4. An insert as defined in claim 1, wherein said grommet wall has an outer radius exceeding the radius of said counterbore to an extent equivalent to more than half the wall thickness of said skirt.

5. An insert as defined in claim 1, wherein said grommet wall has an outer radius exceeding the radius of said counterbore to an extend equivalent to about 60 percent of the wall thickness of said skirt.

6. An insert as defined in claim 1, wherein the extent of expansion of said skirt is such that said annular lip will be drawn inwardly substantially into encircling contact with said plug.

7. An insert as defined in claim 1, wherein said spacer has a length such as to bring the tip of said annular lip into clamping contact with the inner face of the panel skin abutted by said grommet head.

8. An insert as defined in claim 7, wherein said tip is adapted to establish said clamping engagement over a range of panel thicknesses, and is adapted to be contracted so as to enter the hole in said other skin with a wedging action.

9. An insert as defined in claim 1, said spacer being of nonferrous metal alloy having a modulus of elasticity in a range up to 17,300,000 psi.

10. An insert as defined in claim 1, said spacer being of an amorphous material, having a modulus of elasticity in the range of 178,000 psi. to 1,300,000 psi.

* * * * *